United States Patent
Hsieh et al.

[11] Patent Number: 5,984,327
[45] Date of Patent: Nov. 16, 1999

[54] HANDCART

[76] Inventors: Hung-Ching Hsieh; Yung-Shun Hsieh, both of No. 15, Lane 493, Sec. 2, Yuan-Chi Rd, Yuanlin, Chang-Hua Hsien, Taiwan

[21] Appl. No.: 08/908,421

[22] Filed: Aug. 7, 1997

[51] Int. Cl.[6] .................................................. B62B 1/10
[52] U.S. Cl. ........................ 280/47.24; 280/40; 280/38; 280/47.27; 280/47.315
[58] Field of Search ............................. 280/40, 38, 641, 280/645, 42, 651, 652, 655, 47.17, 47.18, 47.24, 47.27, 47.29, 47.315

[56] References Cited

U.S. PATENT DOCUMENTS

| | | | |
|---|---|---|---|
| 3,043,603 | 7/1962 | Major | 280/40 |
| 4,869,526 | 9/1989 | Blake | 280/645 |
| 4,974,871 | 12/1990 | Mao | 280/651 |
| 5,348,325 | 9/1994 | Abrams | 280/40 |
| 5,374,073 | 12/1994 | Hung-Hson | 280/30 |
| 5,468,005 | 11/1995 | Yang | 280/40 |
| 5,727,898 | 3/1998 | Lu | 280/655 |
| 5,746,440 | 5/1998 | Chen | 280/652 |
| 5,803,471 | 9/1998 | DeMars et al. | 280/40 |

*Primary Examiner*—Lanna Mai
*Assistant Examiner*—Michael Cuff
*Attorney, Agent, or Firm*—Erik M. Arnhem

[57] ABSTRACT

A handcart is constructed to include two main frames having outward expanded shoulder and lower portions, an extension handle assembly, an upper crossbar, a lower crossbar, a carrier, and two wheel holders. The two main frames have two upper ends fixedly received in side holes formed at the upper crossbar and two lower ends pivotally connected to the carrier. The extension handle assembly includes two outer pipes, two inner pipes, and a top handle. The upper crossbar is provided with a mechanism means to control the extension and collapse of the inner pipes from and into the outer pipes. The lower crossbar may, together with a fastening strap, hold the carrier and luggages loaded on the carrier in place. When the carrier is extended to a horizontal position, the two wheel holders are extended outward at the same time, permitting the handcart to conveniently carry and transport luggages or articles. And, when the carrier is folded toward the main frames in a vertical position, the two wheel holders are folded inward at the same time. At this point, the whole handcart in a collapsed state can be tied up with a strap for convenient storage.

3 Claims, 17 Drawing Sheets

HANDCART

BACKGROUND OF THE INVENTION

There are various kinds of wheeled carts available in the market for carrying different kinds of articles or luggages, so that a user can use a cart to easily and conveniently pull heavy articles or luggages without effort. Among these conventional wheeled carts, some of them can not be folded or collapsed when they are not in use and therefore always occupy a large space to store them, while others have complicated structure and can not be easily operated or tend to fail easily. It is therefore proposed pressure to provide a collapsible handcart which, on the one hand, allows a user to effortlessly carry or move various kinds of heavy articles or luggage and, on the other hand, can be conveniently folded or collapsed for storage when it is not in use.

SUMMARY OF THE INVENTION

The handcart according to the present invention mainly includes two main frames having outwardly expanded shoulders and lower portions, an extension handle assembly, an upper crossbar, a lower crossbar, a carrier, and two wheel holders. The two main frames have two upper ends fixedly received in side holes formed at the upper crossbar and two lower ends pivotally connected to the carrier. The extension handle assembly includes two outer pipes, two inner pipes, and a top handle. The upper crossbar is provided with means to control the extension and collapse of the inner pipes from and into the outer pipes. The lower crossbar may, together with a fastening strap, hold the carrier and luggage loaded on the carrier in place. When the carrier is extended to a horizontal position, the two wheel holders are extended outward at the same time, permitting the handcart to conveniently carry and transport luggages or articles. And, when the carrier is folded toward the main frames to a vertical position, the two wheel holders are folded inward at the same time At this point, the whole handcart (in a collapsed state) can be tied up with a strap for convenient storage.

DETAILED DESCRIPTION OF THE PREFERRED EMBODIMENTS

Figure 1:
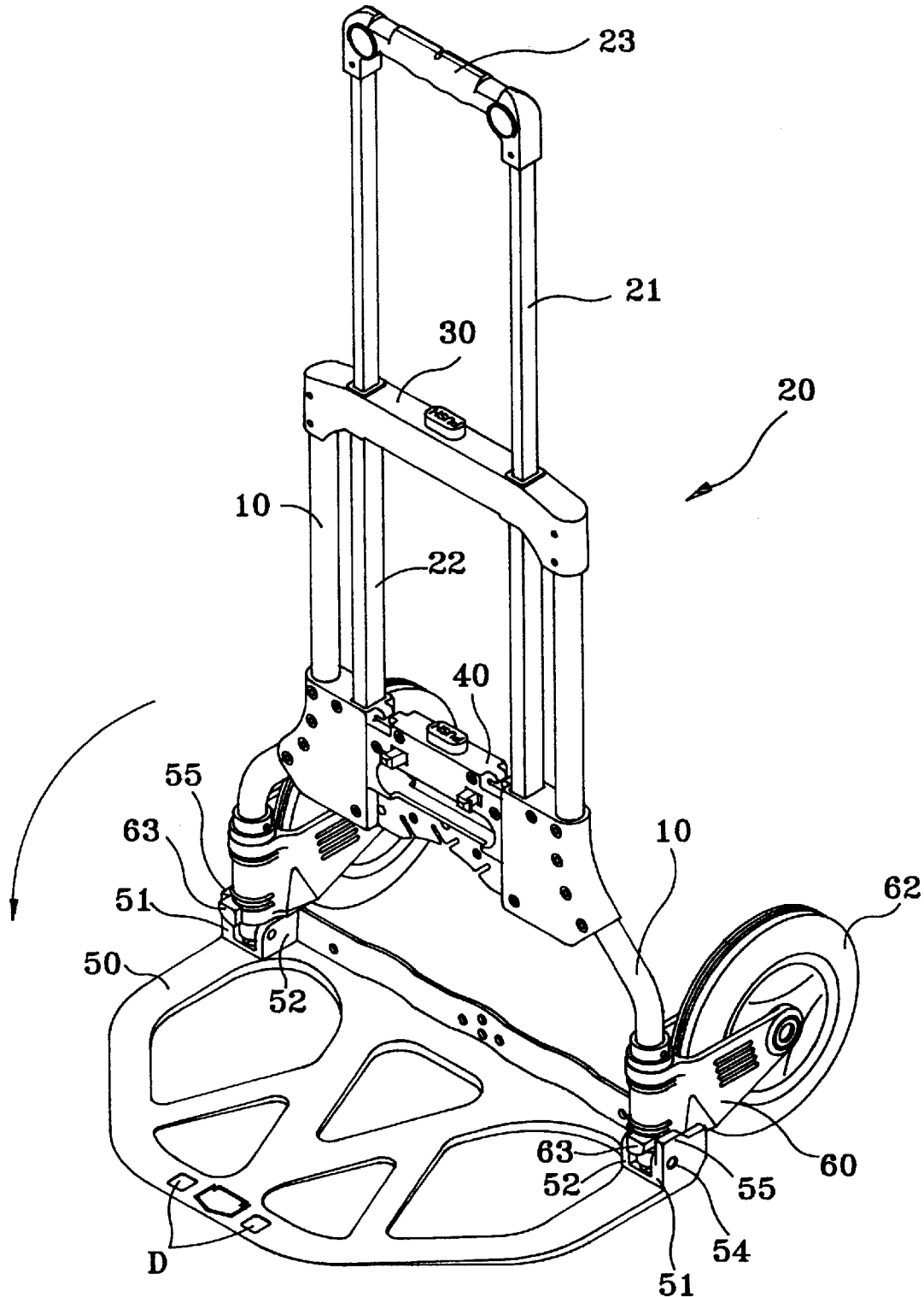
FIGS. 1 and 2 are perspective views showing the handcart of the present invention in an extended and a folded state, respectively.
Figure 2:
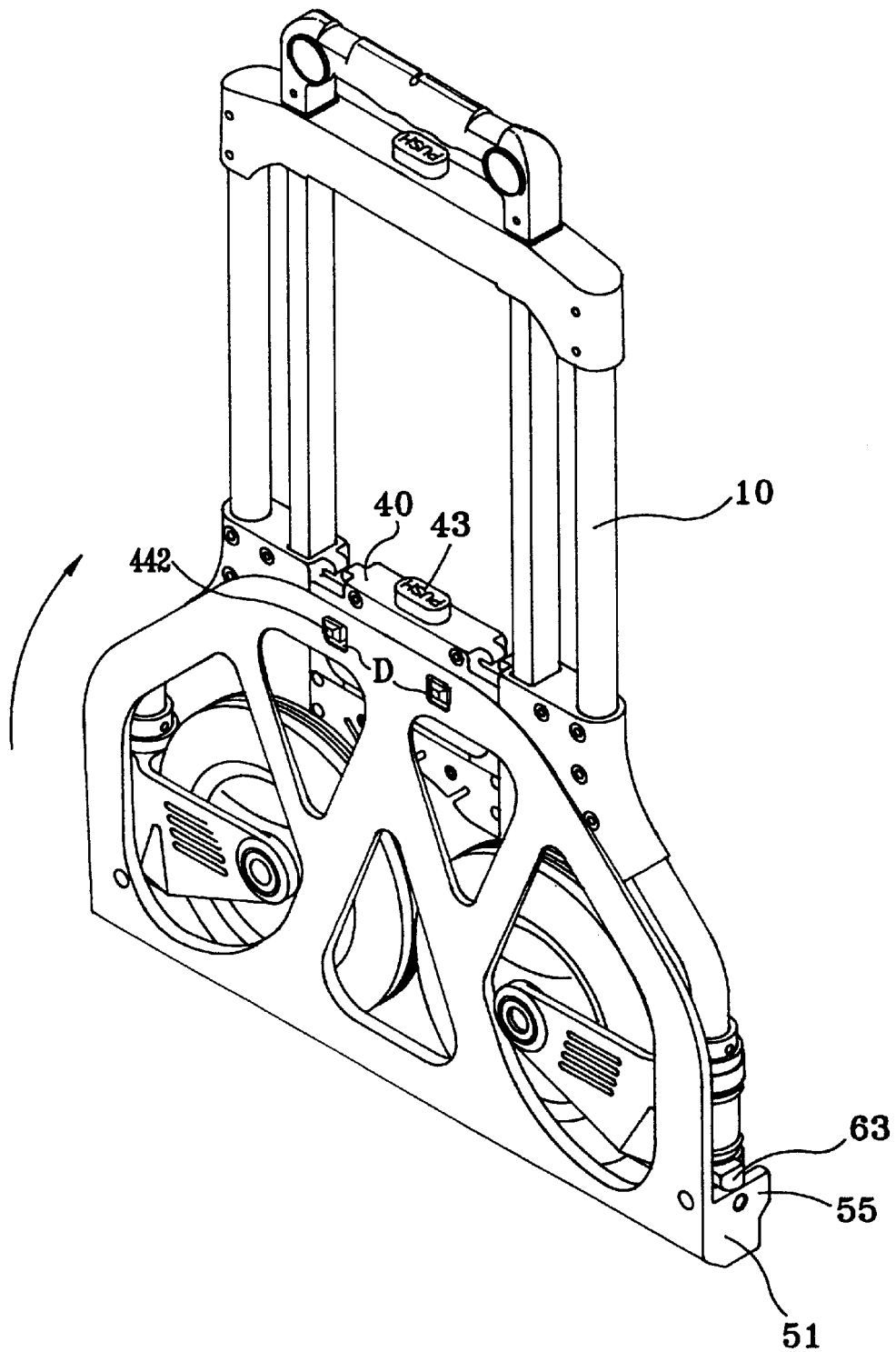
Figure 3:
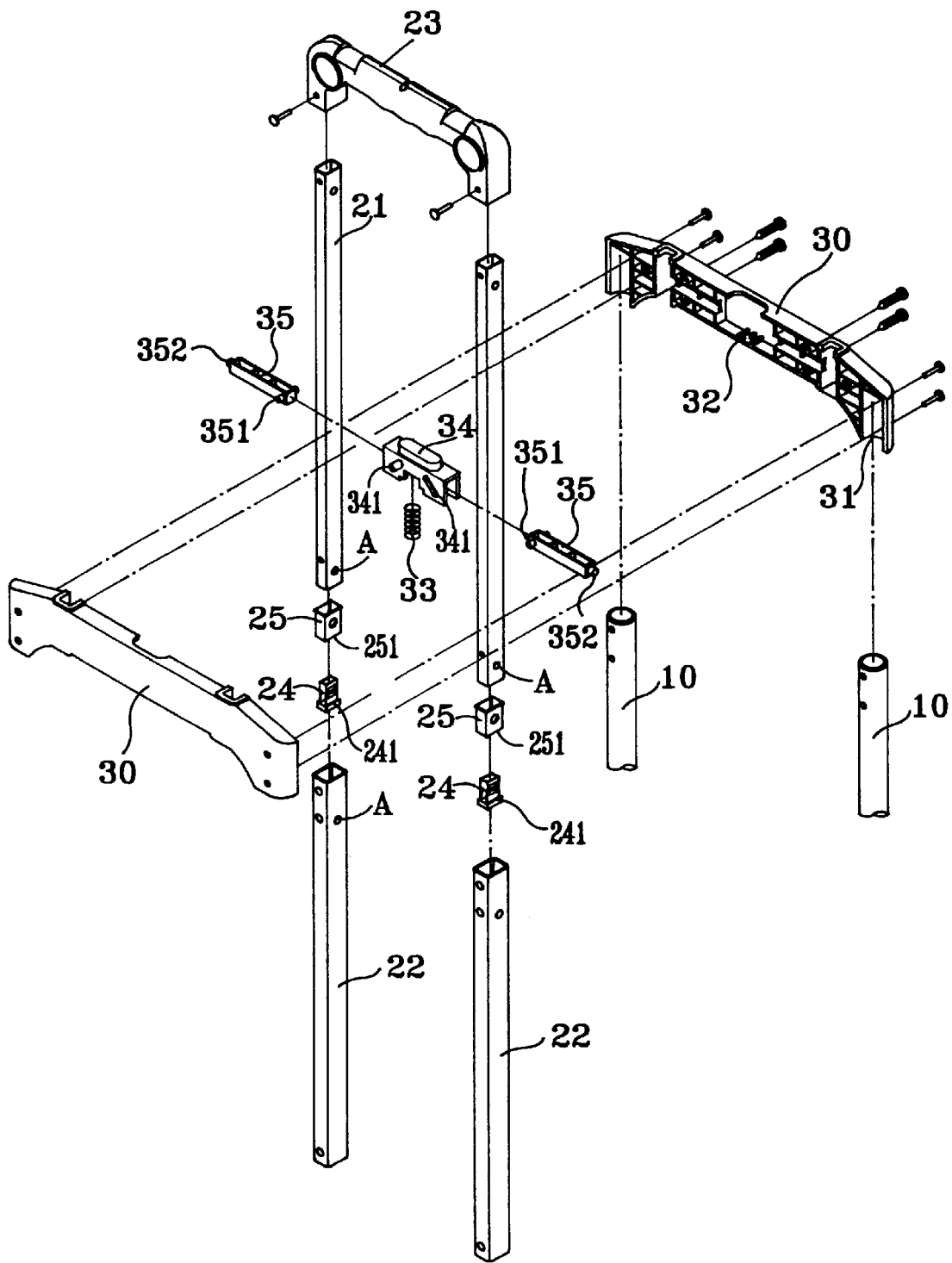
FIG. 3 is an exploded perspective view showing the extension handle assembly and the upper crossbar of the present inveniton.
Figure 8:
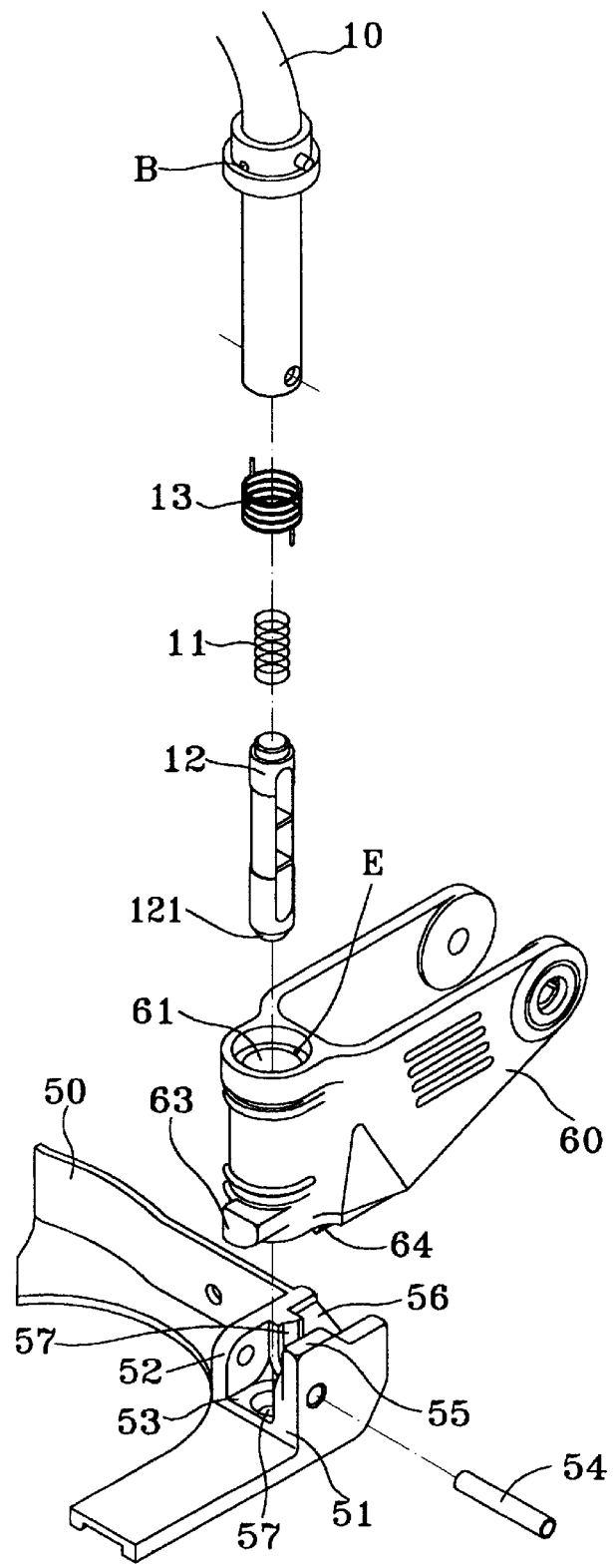
FIG. 8 is a fragmentary, exploded perspective view showing the relation between the main support, the carrier, and the wheel holder.

Please refer to FIGS. 1 and 2. The present invention relates to a handcart which mainly includes two main frames 10 having outward expanded shoulder and lower portions, an extension handle assembly 20, an upper crossbar 30, a lower crossbar 40, a carrier 50, and two wheel holders 60. As shown in FIGS. 1, 3 and 8, the two main frames 10 have two upper ends fixedly received in side holes 31 separately formed at two ends of the upper crossbar 30, and two lower ends separately inserted into shaft holes 61 formed on the two wheel holders 60. Pivotal shafts 54 are used to pivotally connect the main frames 10 to two connecting seats 53 separately provided at two rear corners of the carrier 50. With these arrangements, the main frames 10, the wheel holders 60 (with wheels 62 connected thereto), and the carrier 50 are connected to form a whole body.

The extension handle assembly 20 is shown in FIG. 3. It includes two symmetrical outer pipes 22, two symmetrical inner pipes 21 slidably positioned in the two outer pipes 22, and a top handle handgrip 23. The two outer pipes 22 are fixed in place by the upper and the lower crossbars 30, 40, while the two crossbars 30, 40 are respectively fixedly connected to two upper ends and two shoulder portions of the main frames 10, such that the two outer pipes, the two crossbars 30, 40, and the main frames 10 are connected to form a whole body.

As shown in FIG. 3, each of the inner pipes 21 has an inner pipe insert 24 connected to an inner lower end of the inner pipe 21, and each of the outer pipes 22 has an outer pipe insert 25 connected to an inner upper end of the outer pipe 22. When the inner pipe 21 is positioned in the outer pipe 22, a lower flange 241 of the inner pipe insert 24 shall press against a lower edge 251 of the outer pipe insert 25 and therefore prevents the inner pipe 21 from separating from the outer pipe 22 when the inner pipe 21 is pulled upward relative to the outer pipe 22.

Figure 4:
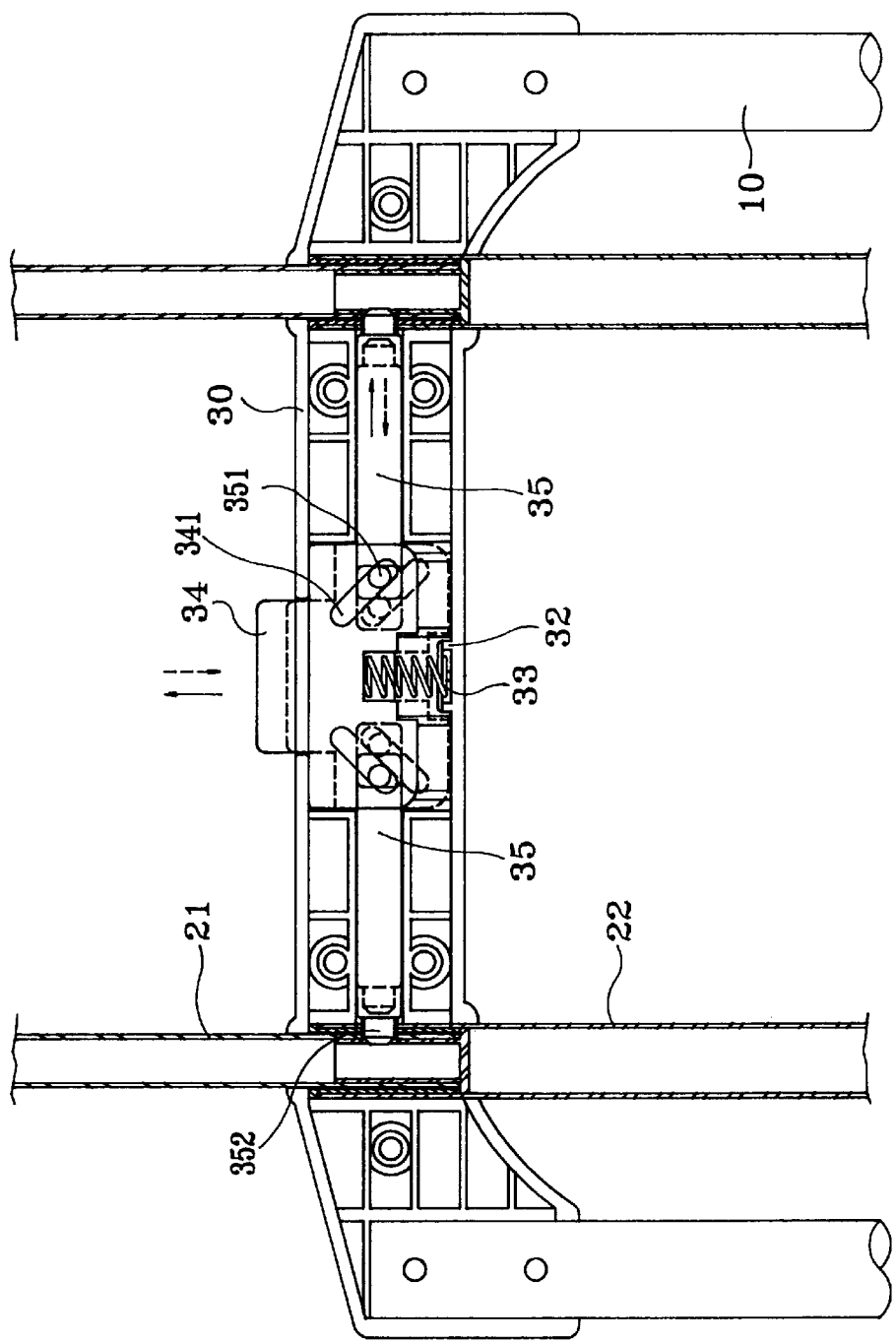
FIG. 4 is a partial sectional view showing the operation of the upper crossbar to extend or collapse the extension handle assembly of the present invention.
Figure 5:
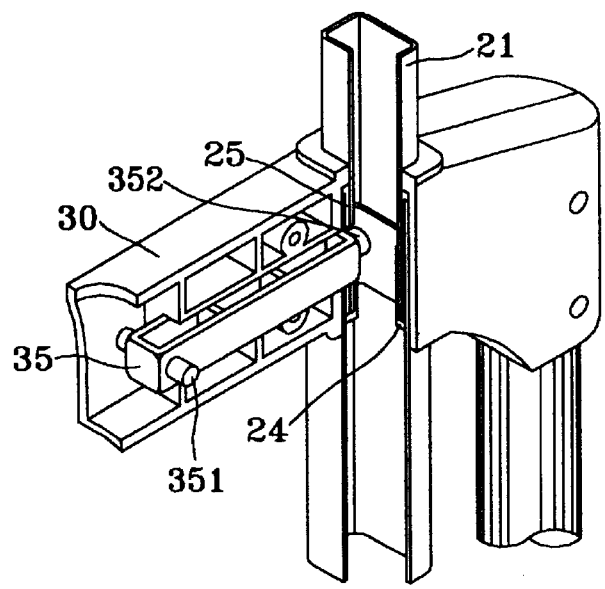
FIG. 5 is a fragmentary perspective crossbar of the present invention showing the operation of the upper crossbar to extend or collapse the extension handle assembly.
Figure 7:
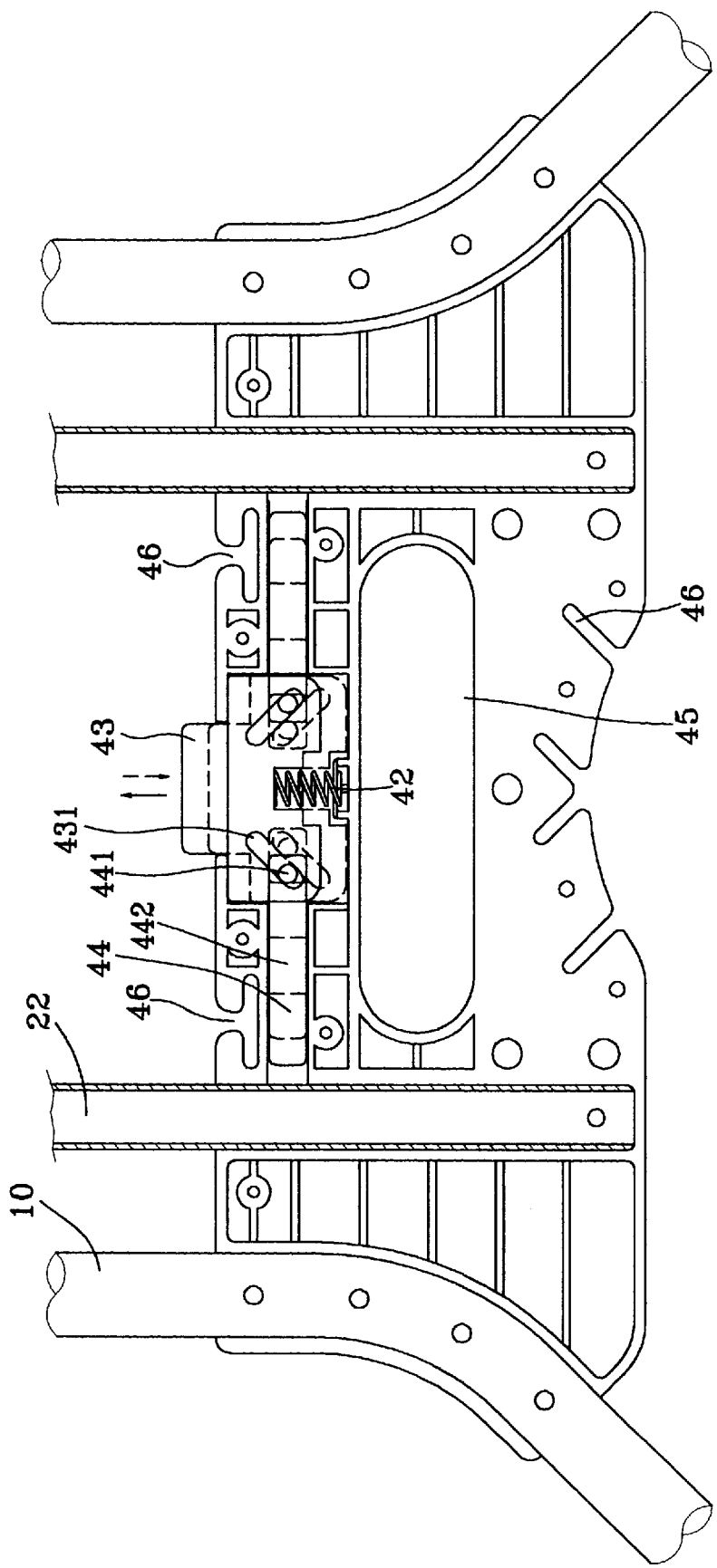
FIG. 7 is a partial sectional view showing the operation of the lower crossbar of the present invention.

As shown in FIGS. 3, 4 and 5, the upper crossbar 30 has two side holes 31 formed at two ends to receive two upper ends of the main frames 10 therein. A guide channel 32 is provided inside the upper crossbar 30 for a compression spring 33. An operation push button 34 is provided above the compression spring 33, such that the push button 34 can contact with the compression spring 33 to depress the latter. The push button 34 includes two side walls on each of which two opposite outward and downward inclined long holes (or slots) 341 are formed. Two links 35 are disposed at two ends of the push button 34, such that two lugs or pins 351 symmetrically and sideward projecting from an inner end of each link 35 are located in the long holes 341 and can move reciprocatingly in the long holes 341. An insertion pin 352 axially projects from another (outer) end of each link 35 to extend into insertion holes A separately formed at the lower end of the inner pipe 21 and the upper end of the outer pipe 22 for controlling extension or collapse of the inner pipe 21 from or into the outer pipe 22. When the operation push button 34 is depressed, the outward and downward inclined long holes; 341 guide the lugs 351 to shift inward, causing the insertion pins 352 of the links 35 to disengage from the insertion holes A on the inner and the outer pipes 21 and 22 to allow the inner pipes 21 to freely move up or down in the outer pipes 22.

Figure 14:
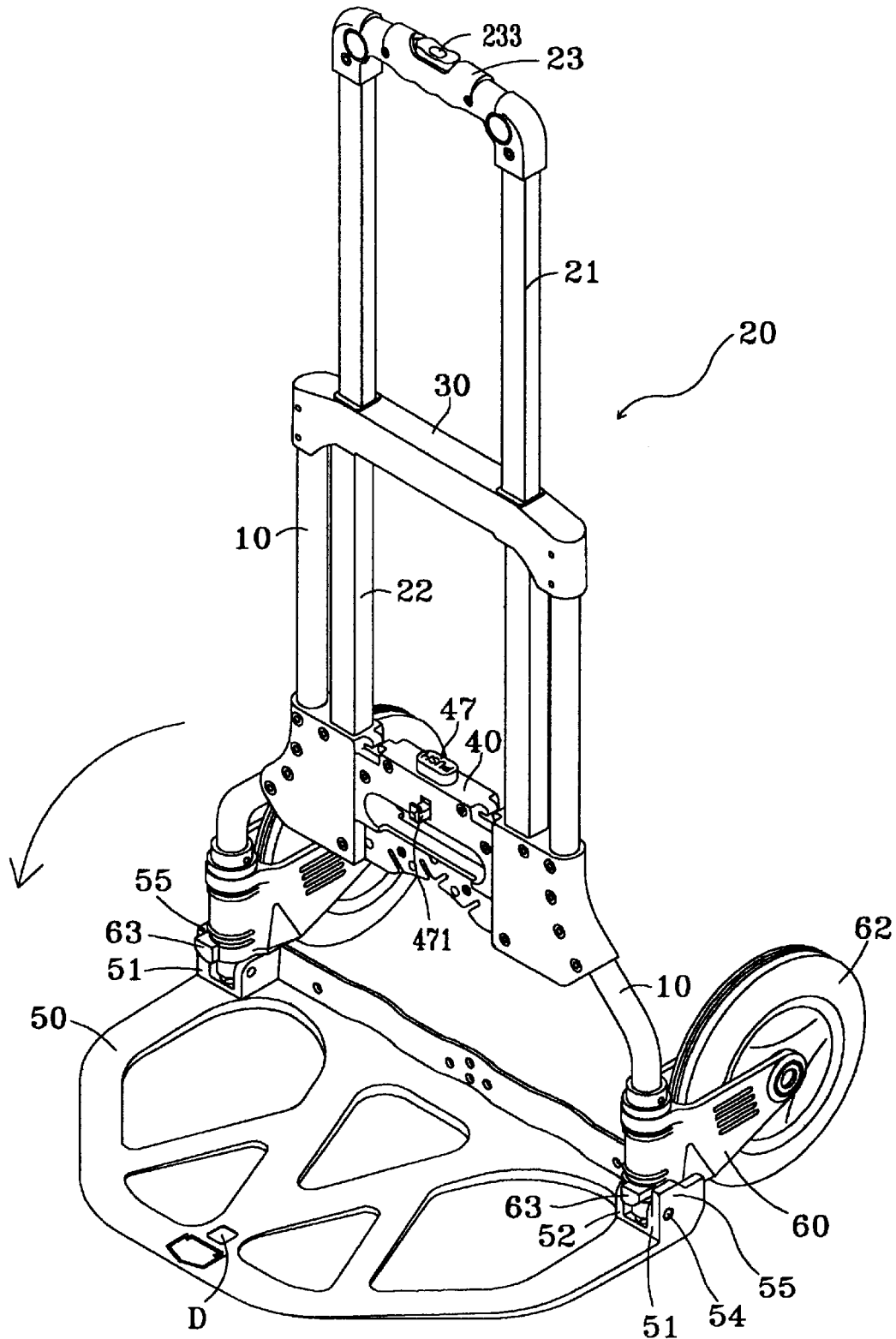
FIG. 14 is a perspective showing a second embodiment of the present invention in an extended state.
Figure 15:
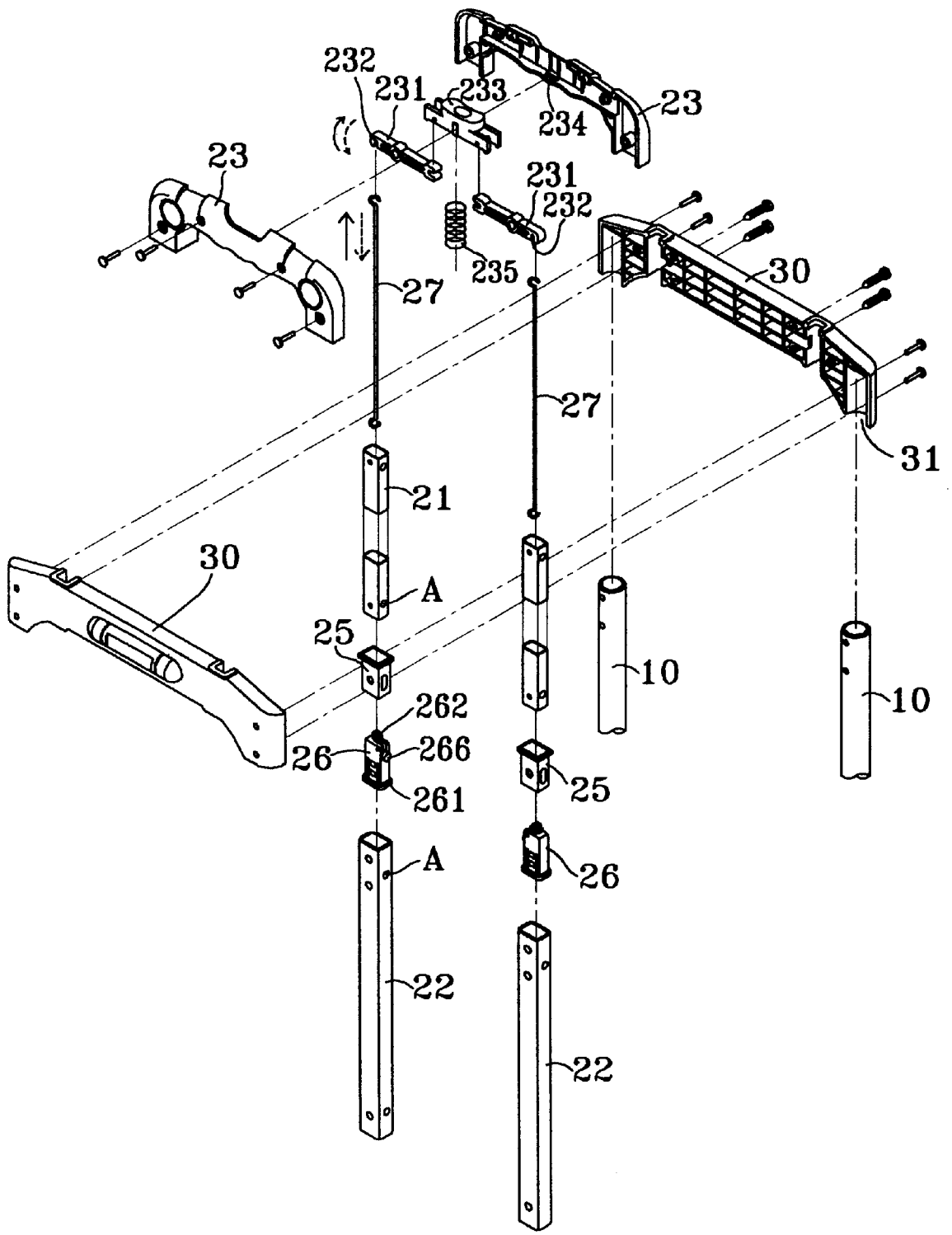
FIG. 15 is a fragmentary, exploded perspective showing the extension handle assembly and the upper crossbar according to the second embodiment of the present invention.

FIGS. 14 and 15 illustrate a second embodiment of handgrip 23 of the present invention. In this embodiment, the top handle handgrip 23 of the extension handle assembly 20 has a guide channel 234 formed therein to receive a compression spring 235. An operation push button 233 is provided above the compression spring 235. Two arms 231 are separately connected at one end to two ends of the push button 233, such that when the push button 233 is depressed, the other ends of the two arms 231 and two links 27 connected at upper ends to the other ends of the arms 231 are lifted.

Figure 16:
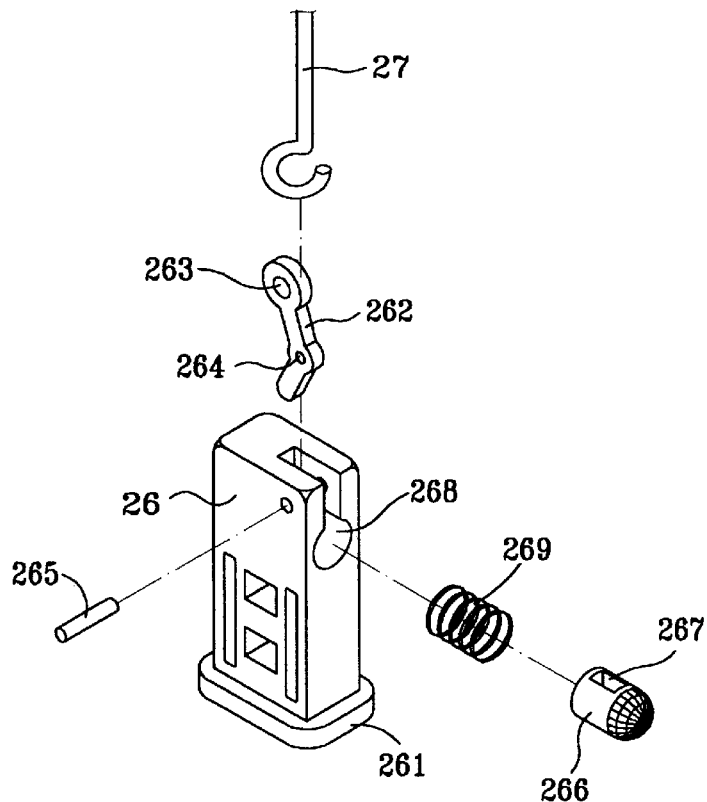
FIG. 16 is a fragmentary, exploded perspective of the present invention showing the structure of the retaining member in the embodiment of FIGS. 14 and 15.
Figure 17:
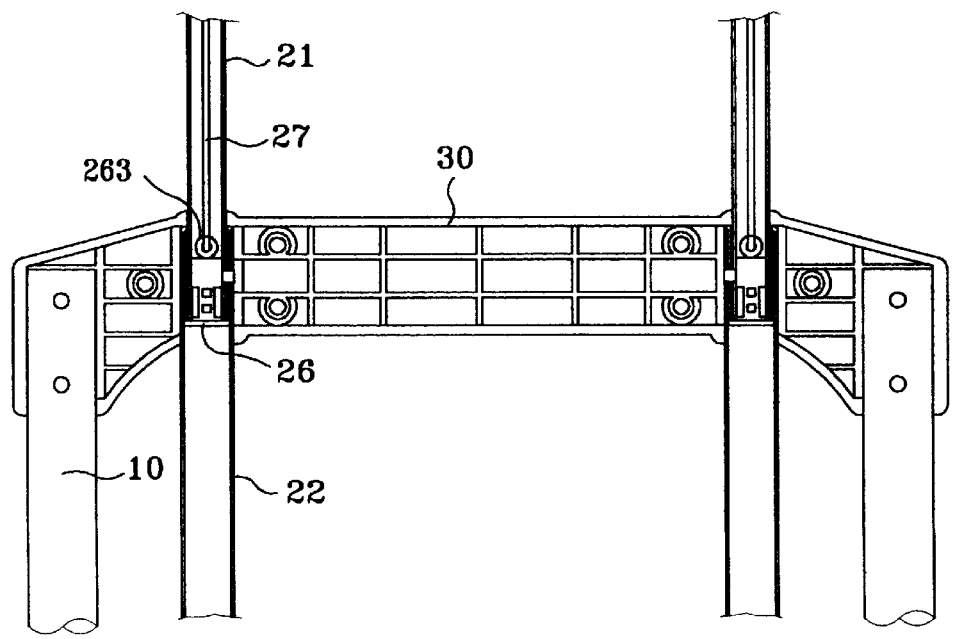
FIG. 17 is a partial sectional view showing the relation between the extension handle assembly and the upper crossbar of the embodiment in FIG. 15.

Please refer to FIGS. 15, 16, and 17 at the same time. In the second embodiment of the present invention, each inner pipe 21 has a retaining member 26 inserted into the inner lower end thereof. The retaining member 26 has a lower flange 261 which shall press against the lower edge of the outer pipe insert 25. The retaining member 26 has a guide groove 268 for receiving a compression spring 269 and an insertion pin 266 therein. The insertion pin 266 is formed with an elongated slot 267 to accommodate a lower end of a bent retaining arm 262. The link 27 has an upper end hooked to a hooking hole 232 of the arm 231 in the top handle 23 and a lower end hooked to a hooking hole 263 on the bent retaining arm 262. The bent retaining arm 262 is pivotally connected to the retaining member 26 by a shaft 265 extending through a shaft hole 264 on the bent retaining arm 262, so that the bent retaining arm 262 can swing inward and outward relative to the retaining member 26. The insertion pin 266 is normally pushed outward by the compression spring 269, so that the insertion pin 266 projects into insertion holes A formed on the inner pipe 21 and the outer pipe 22 and thereby connects the inner pipe 21 and the outer pipe 22 together. However, when the link 27 is lifted upward, it causes the bent retaining arm 262 hooked to a lower end of the link 27 to swing inward. The retaining arm 262 (swung inward forces the insertion pin 266 to move inward) and disengage from the insertion holes A on the inner and the outer pipes 21, 22. At this point, the inner pipe 21 can be freely extended from or pushed into the outer pipe 22.

Figure 18:
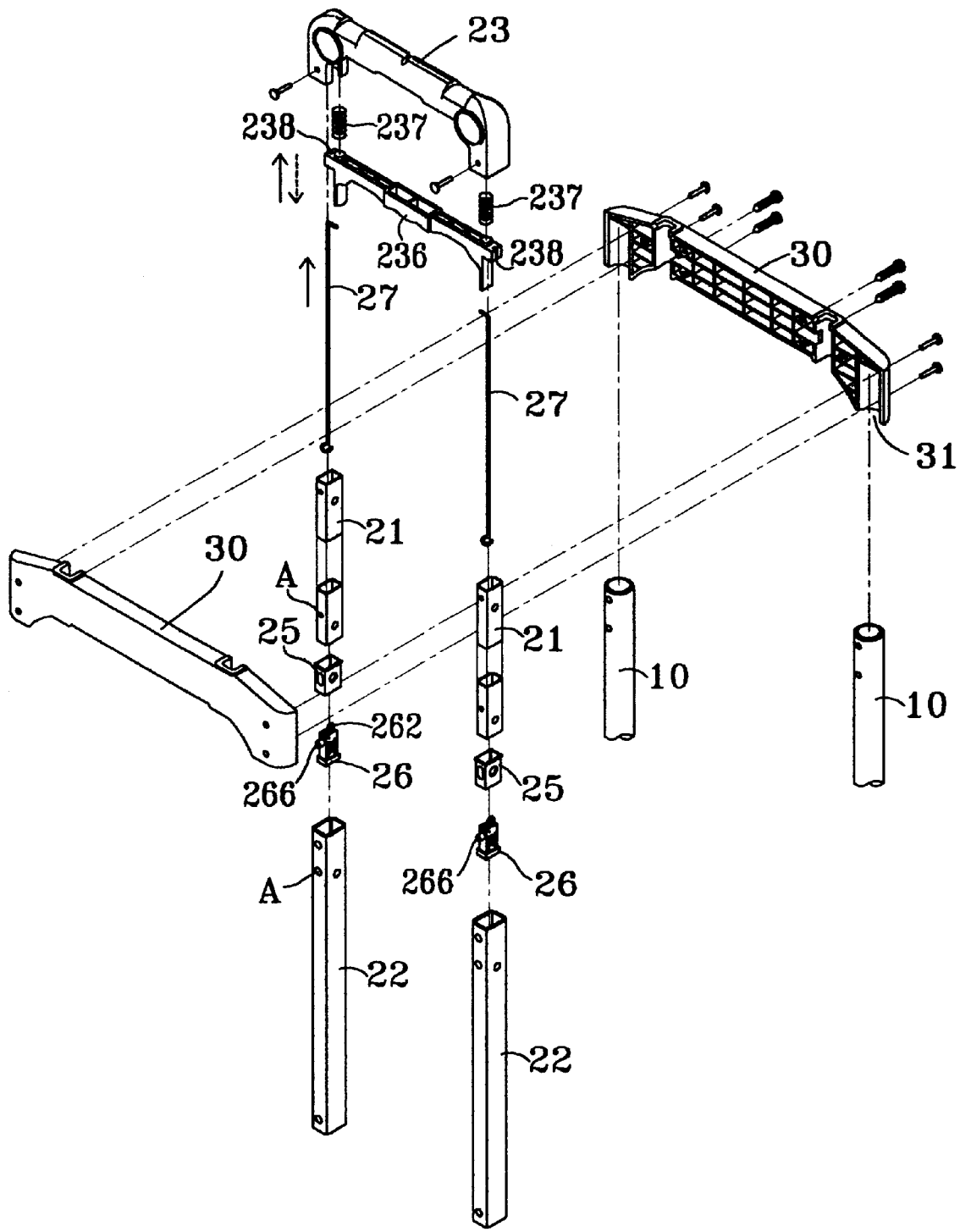
FIG. 18 is a fragmentary, exploded perspective view showing a second embodiment of the top handle of the extension handle assembly.

FIG. 18 illustrates another embodiment of the top handle 23 of the extension handle assembly 20. In this embodiment, the top handle 23 includes an elongated pull member 236 forming a lower part thereof. Two compression springs 237 are separately disposed on two upper outer ends of the elongated pull member 236 between the top handle 23 and the elongated pull member 236, so that the elongated pull member 236 can be pulled upward toward the top handle 23. A vertical groove 238 is provided at each end surface of the elongated pull member for an upper end of the previously mentioned link 27 to hook thereto. When the elongated pull member 236 is pulled upward, two links 27 hooked to two ends of the elongated pull member are pulled upward, too. At this point, two bent retaining arms 262 connected to the lower ends of the two links 27 swing inward to disengage the insertion pins 266 from the insertion holes A on the inner and the outer pipes 21, 22, allowing the inner pipes 21 to be freely extended from or pushed into the outer pipes 22.

Please refer back to FIGS. 1 and 8 in which a carrier 50 in the form of a flat plate is shown. A connecting seat 53 defined by an outer side wall 51 and an inner side wall 52 is provided at each rear corner of the carrier 50. The connecting seats 53 receive two lower ends of the main frames 10 therein. Pivotal shafts 54 are used to pivotally connect the main frames 10 to the carrier 50. Each outer side wall 51 each is formed with an upward projected stopper 55 corresponding to another stopper 63 formed on the wheel holder 60. When the carrier 50 is pivotally turned downward to an extended position as shown in FIG. 1, or is pivotally turned upward to a folded position as shown in FIG. 2, the stopper 55 pushes against the stopper 63 to cause the wheel holder 60 to turn outward to an extended position or to turn inward to a folded position, respectively.

Figure 11:
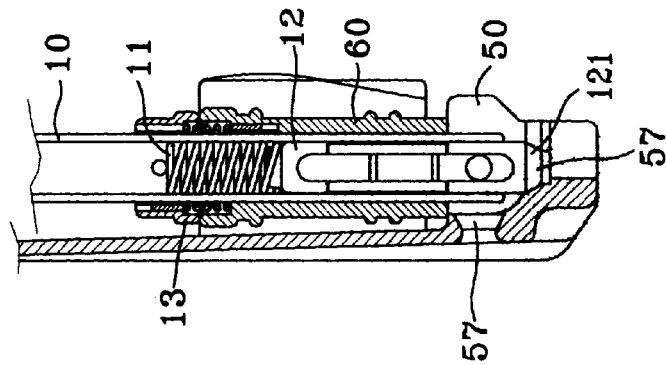
FIG. 11 is another partial sectional view showing the carrier and the wheel holder in an folded state.
Figure 10:
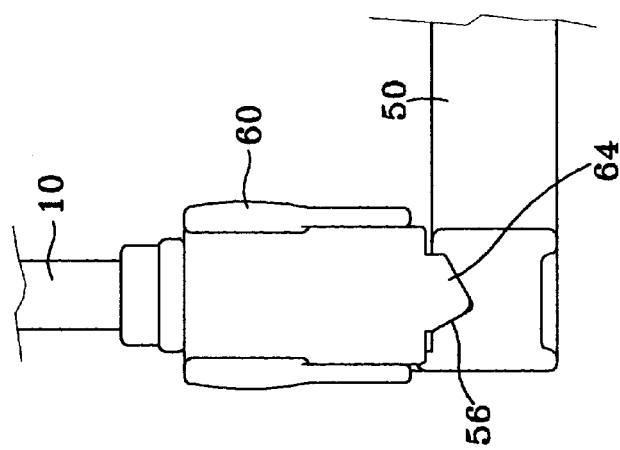
FIG. 10 is a partial side view showing the carrier and the wheel holder in an extended state.
Figure 9:
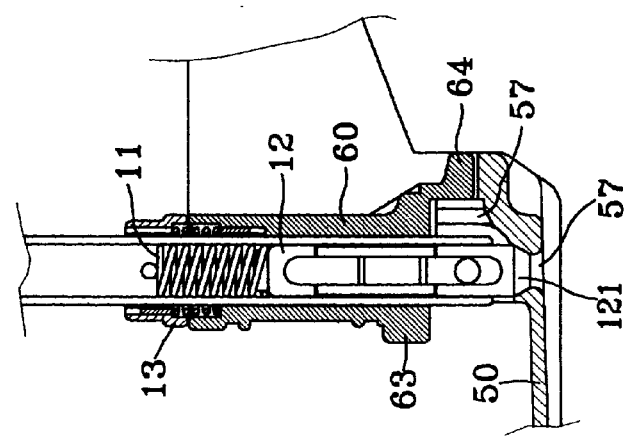
FIG. 9 is a partial sectional view showing the carrier and the wheel holder in an extended state.

Please now refer to FIGS. 1, 8 and 11 at the same time. The main frame 10 each has a movable member 12 and a compression spring 11 on the movable member 12 disposed in the lower end of the main frame 10. Meanwhile, a return spring 13 is put around the outer lower end of the main frame 10 with an end fixedly connected to a hole B formed on the main frame 10 and the other end fixedly connected to a hole E formed on an inner wall of the shaft hole 61 of the wheel holder 60. When the carrier 50 is gradually extended to a horizontal position, the wheel holders 60 are synchronously shifted outward. At this point, the return springs 13 are forced to extend and generate a torque force. When the wheel holders 60 are completely extended as shown in FIG. 1, two conic stoppers 64 separately provided at a bottom of the wheel holders 60 engage into two recesses 56 on two rear corners of the carrier 50, as shown in FIGS. 8, 9 and 10, and thereby locate the wheel holders 60 in place. To collapse the handcart of the present invention, simply pivotally turn the carrier upward, so that the conic stoppers 64 disengage from the recesses 56. At this point, the return springs 13, due to their own recovery force, shall bring the wheel holders 60 to turn inward the carrier 50 and finally to a completely folded position.

Each connecting seat 53 of the carrier 50 as shown in FIGS. 8, 9 and 11 is formed at a bottom and a rear side wall with two saucer-like sliding recesses 57, so that a lower end of the movable member 12 disposed in the lower end of the main frame 10 can engage thereinto. Since the connecting seats 53 have smoothly curved inner walls and the movable members 12 have round-head conic lower ends 121 matching with the saucer-like recesses 57, the movable members 12 are allowed to smoothly slide and shift between the inner walls of the connecting seats 53 and the two saucer-like recesses 57, permitting the carrier 50 to be smoothly extended from or folded toward the main frames 10 and be fixed in place when it is completely extended or folded.

Figure 19:
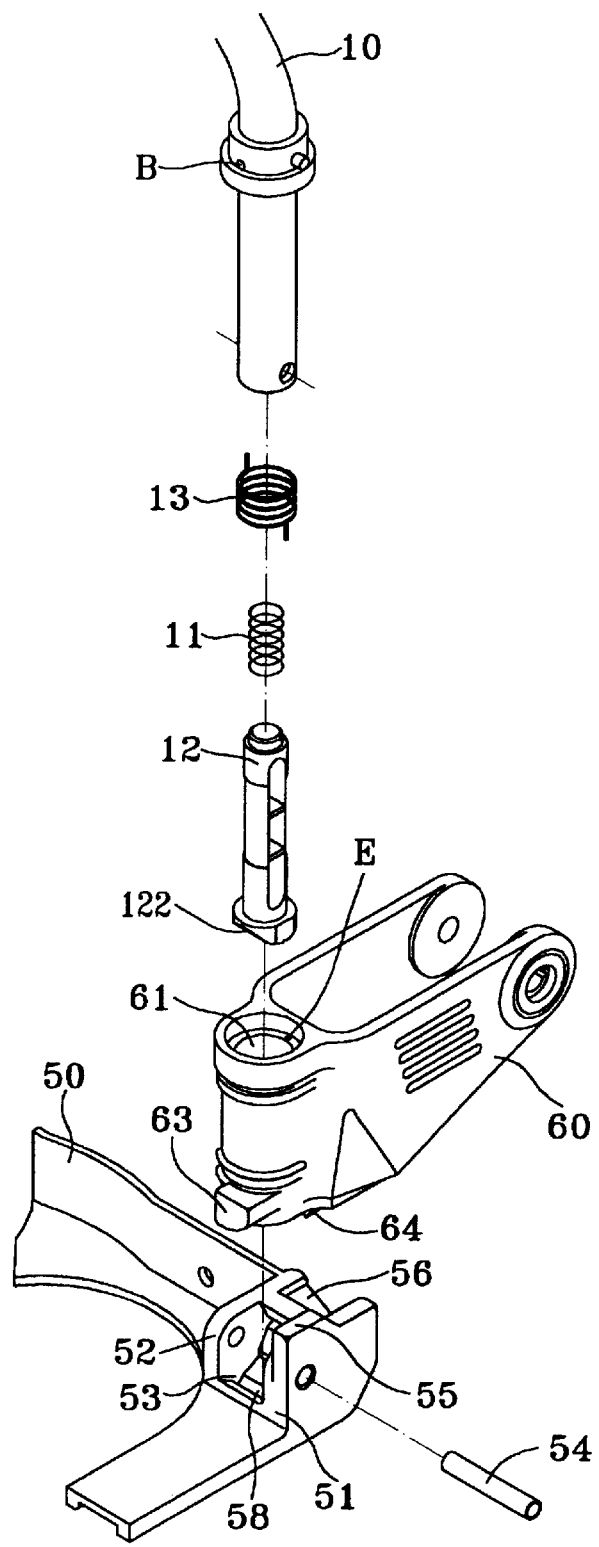
FIG. 19 is a fragmentary perspective showing a second embodiment of the main frame and the carrier.
Figure 20:
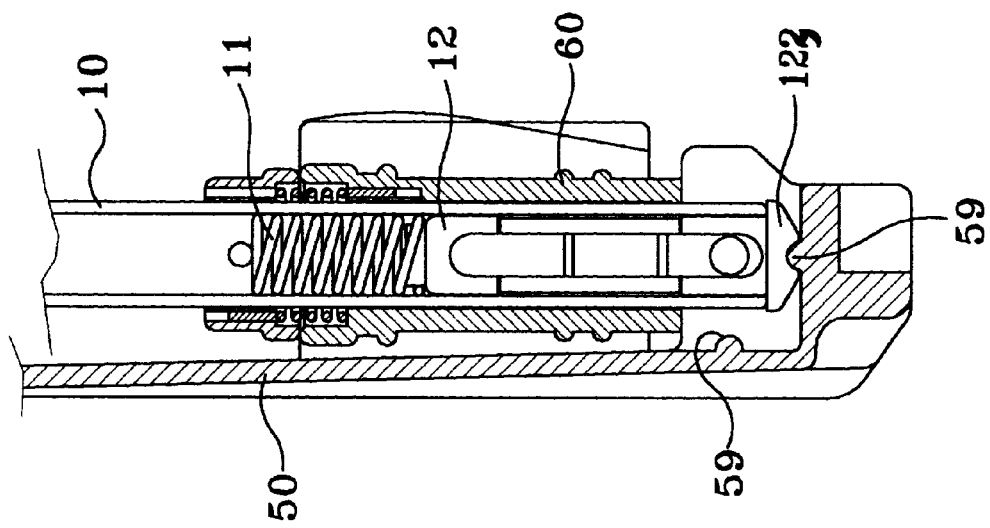
FIG. 20 is a partial sectional view showing the relation between the main frame and the carrier in the embodiment of FIG. 19.

FIGS. 19 and 20 illustrate a second embodiment of the connecting seat 53 of the carrier 50. In this embodiment, the connecting seat 53 is formed at its bottom and its rear side wall with two grooves 58 having two outward inclined side walls for engaging with the lower end of the movable member 12. Since the connecting seats 53 have smoothly curved inner walls and the movable members 12 have lower ends 122 with two beveled surfaces that match with the profile of the grooves 58, the movable members 12 are allowed to smoothly slide and shift between the inner walls of the connecting seats 53 and the two grooves 58, permitting the carrier 50 to be smoothly extended from or folded toward the main frames 10 and be fixed in place when it is completely extended or folded.

Figure 22:
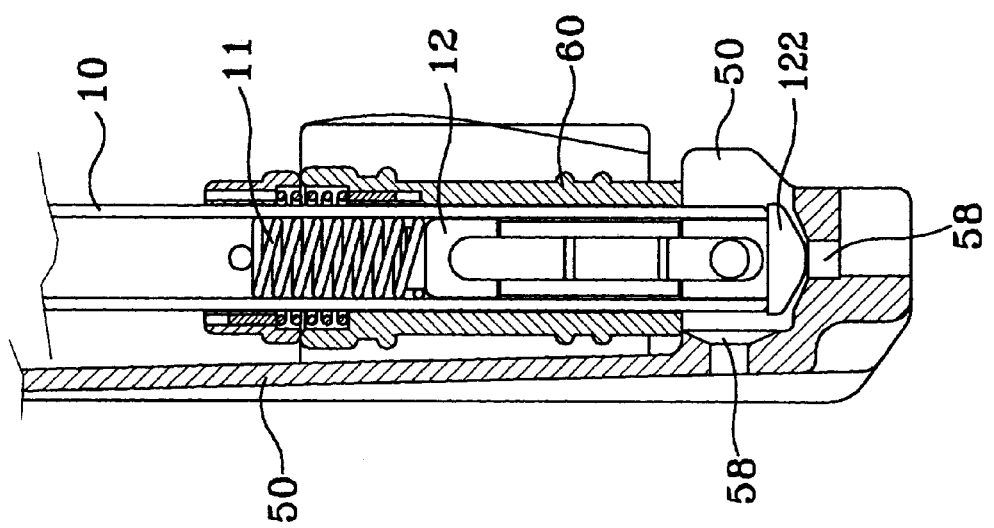
FIG. 22 is a paratial sectional view showing the relation between the main frame and the carrier in the embodiment of FIG. 21.
Figure 21:
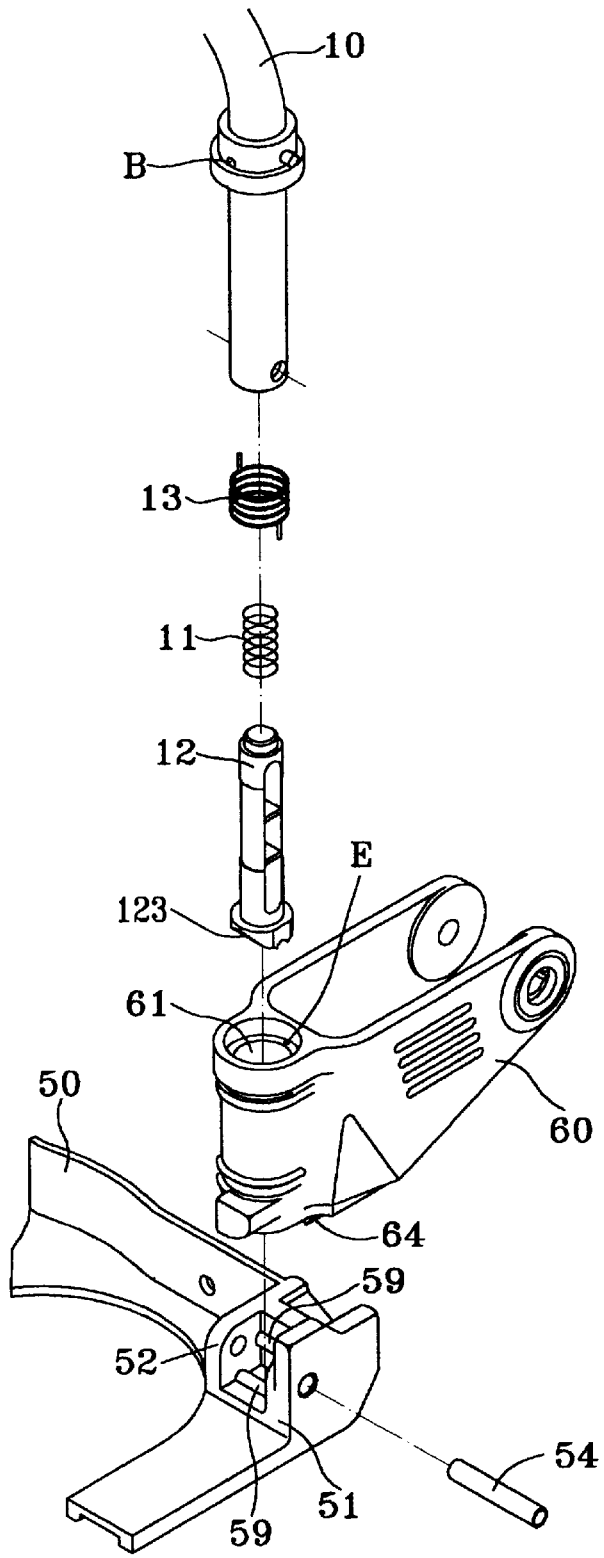
FIG. 21 is a fragmentary perspective view showing a third embodiment of the main frame and the carrier.

FIGS. 21 and 22 illustrate a third embodiment of the connecting seat 53 of the carrier 50. In this embodiment, the connecting seat 53 is formed at its bottom and its rear side wall with two elongated bulges 59 across the seat 53 for engaging with the lower end of the movable member 12. Since the connecting seats 53 have smoothly curved inner walls and the movable members 12 have inward curved recesses 123 formed at lower ends to match with the profile of the bulges 59, the movable members 12 are allowed to smoothly slide and shift between the inner walls of the connecting seats 53 and the two bulges 59, permitting the carrier 50 to be smoothly extended from or folded toward the main frames 10 and be fixed in place when it is completely extended or folded.

The lower crossbar 40 as shown in FIGS. 1, 2, 6 and 7 includes two symmetrical panels. One of these two panels is formed with two laterally symmetrical openings C corresponding to two insertion holes D on the carrier 50. A guide channel 41 is formed in the lower crossbar 40 to receive a compression spring 42 therein. An operation push button 43 is provided above the compression spring 42, so that the push button 43 can be depressed against the compression spring 42. The push button 43 is formed at each side wall with two downward and outward inclined long holes (or slots) 431 for receiving two links 44 therein. Each link 44 has an inner end provided with two symmetrical lugs 441 which side project through the two inclined long holes 431, such that the lugs 441 can reciprocatingly move within the inclined long holes 431. Each link 44 is formed at a side surface with a projected hook 442 (FIG. 6) which extends through the opening C formed on the lower crossbar 40. When the push button 43 is depressed, the inclined long holes 431 guides the lugs 441 to move inward along the long holes 431. At this point, the hooks 442 on the links 44 are also moved inward and fall into the two insertion holes D (FIG. 21) on the carrier 50 when the carrier 50 is folded toward the main frames 10, and thereby firmly hook the carrier to the lower crossbar 40.

Figure 23:
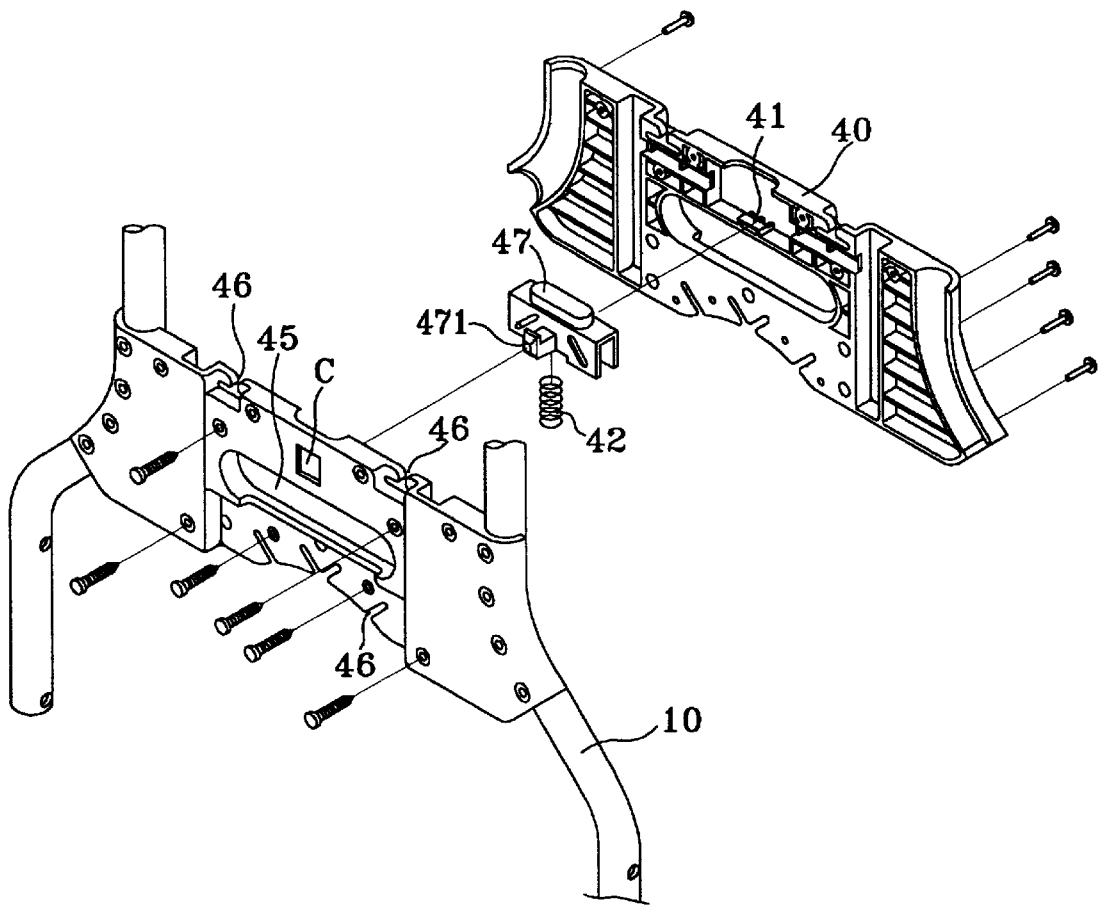
FIG. 23 is a fragmentary perspective showing a second embodiment of the lower crossbar of the present invention.
Figure 24:
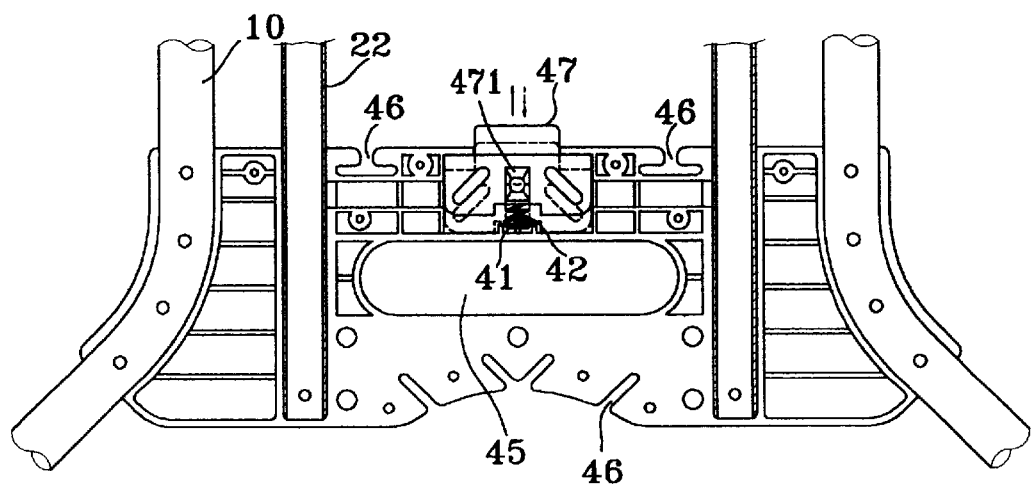
FIG. 24 is a partial sectional view showing the lower crossbar of the embodiment in FIG. 23.

FIGS. 14, 23 and 24 illustrate a second embodiment of the lower crossbar 40 of the present invention. In this embodiment, one of the two panels forming the lower crossbar 40 is provided at a central portion with an opening C corresponding to an insertion hole D formed on the carrier 50. A guide channel 41 is formed in the lower crossbar 40 to receive a compression spring 42 therein. An operation push button 47 is provided above the comrpession spring 42. The push button 47 is provided at a side surface with a central hook 471 which projects out of the opening C on the lower crossbar 40 and can extend through the insertion hole D on the carrier 50 to hook the carrier in place when the carrier 50 is folded toward the lower crossbar 40.

Figure 6:
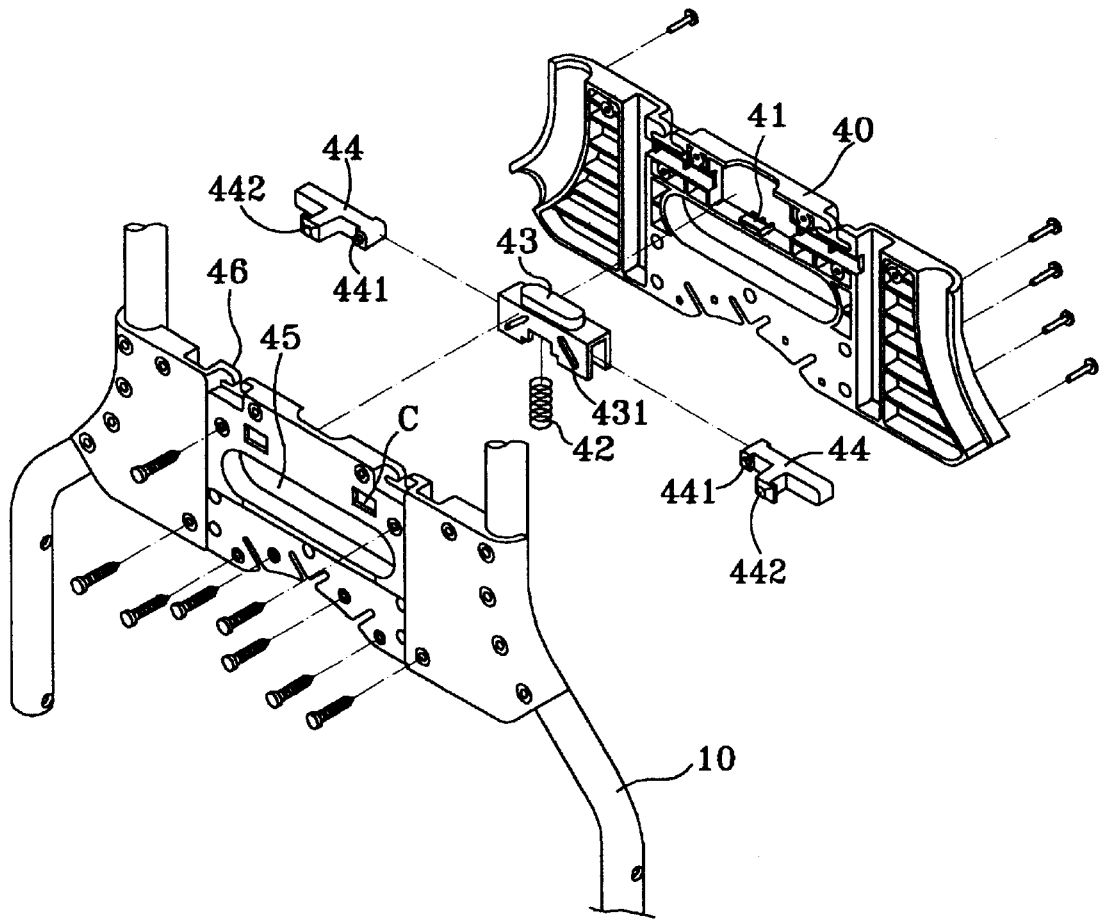
FIG. 6 is a fragmentary, exploded perspective view of the present invention showing the lower crossbar of the present invention.
Figure 13:
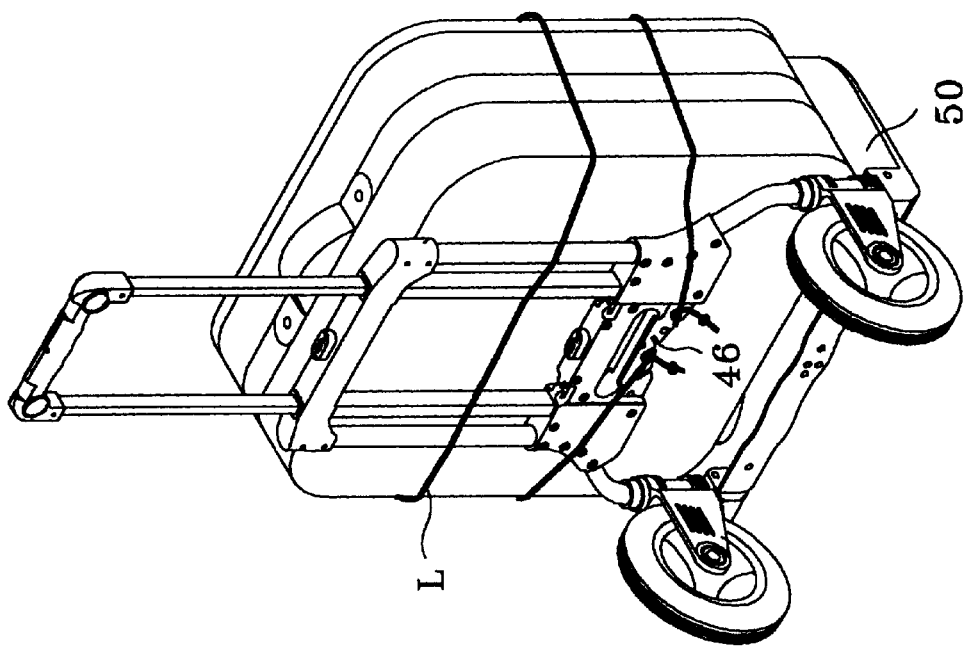
FIG. 13 illustrates the handcart of the present invention in an extended state to carry a luggage which is further tied to the handcart by means of a fastening strap.
Figure 12:
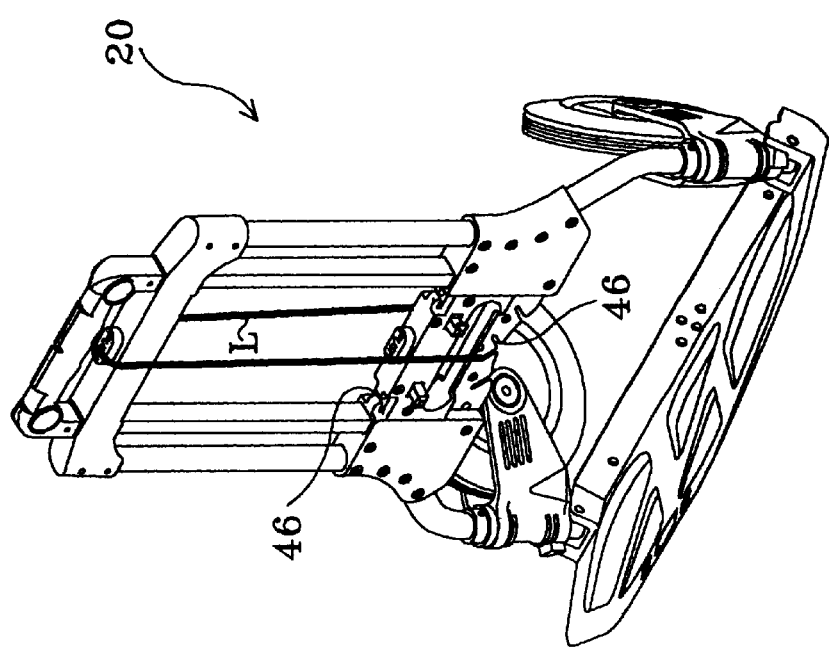
FIG. 12 illustrates the extension handle assembly of the handcart of the present invention in a collapsed state, wherein a fastening strap is used to tie up the collapsed extension handle assembly.

The lower crossbar 40 as illustrated in FIGS. 6, 12 and 13 is formed with a rectangular hole 45 for a user's hand to hold and a plurality of narrow slits 46 for straps L to pass through and firmly tie up the collapsed handcart, so that the collapsed handcart can be more conveniently carried by the user or be stored while occupying only a minimized space.

With the above arrangements, the handcart of the present invention is novel in its structure and is convenient for use and operation.

What is claimed is:

1. A handcart, comprising a frame structure that includes two main frame elements (10,10) having upper and lower ends, an upper crossbar (30) connecting the upper ends of said main frame elements, and a lower crossbar (40) connecting said frame elements below said upper crossbar;

first and second pipes (22,22) extending between said upper crossbar and said lower crossbar; an extensible handle assembly comprising third and fourth pipes (21,21) telescopically slidable in said first and second pipes, and a handle handgrip (23) connecting said third and fourth pipes, whereby said handle assembly can be adjusted so that said handgrip has a collapsed position in close proximity to said upper crossbar or an extended position spaced an appreciable distance above said upper crossbar;

a carrier (50) swingably connected to the lower ends of said main frame elements for movement between a folded position extending parallel to said main frame elements, and an operating position extending angularly away from said main frame elements;

two ground wheels (62,62) for supporting said frame structure in an upright position, and a wheel holder (60) for each wheel; each wheel holder having a swivel fit on one of said main frame elements in the space above said carrier, whereby each wheel holder can be moved between a folded position located in the plane of said main frame elements, and an operating position extending angularly away from the plane of said main frame elements; and manual latch means for releasably retaining said carrier in the folded position; said latch means comprising a manual pushbutton (43) located on said lower crossbar, a latch opening (D) in said carrier, and a shiftable latch hook (442) carried by said lower crossbar operably connected to said pushbutton for releasable engagement in said latch opening.

2. A handcart, comprising a frame structure that includes two main frame elements (10,10) having upper and lower ends, an upper crossbar (30) connecting the upper ends of said main frame elements, and a lower crossbar (40) connecting said frame elements below said upper crossbar;

first and second pipes (22,22) extending between said upper crossbar and said lower crossbar; an extensible handle assembly comprising third and fourth pipes (21,21) telescopically slidable in said first and second pipes, and a handle handgrip (23) connecting said third and fourth pipes, whereby said handle assembly can be adjusted so that said handgrip has a collapsed position in close proximity to said upper crossbar or an extended position spaced an appreciable distance above said upper crossbar;

a carrier (50) swingably connected to the lower ends of said main frame elements for movement between a folded position extending parallel to said main frame elements, and an operating position extending angularly away from said main frame elements;

two ground wheels (62,62) for supporting said frame structure in an upright position, and a wheel holder (60) for each wheel; each wheel holder having a swivel fit on one of said main frame elements in the space above said carrier, whereby each wheel holder can be moved between a folded position located in the plane of said main frame elements, and an operating position extending angularly away from the plane of said main frame elements;

detent means (64) carried by each wheel holder, and mating recesses (56) on said carrier for engagement with said detent means to retain said wheel holders in the operating positions; and torsion spring means (13) biasing each said wheel holder to its folded position.

3. The handcart of claim 2,aand further comprising;

a manual latch means for releasably retaining said carrier in its folded position; said latch means comprising a manual pushbutton (43) located on said lower crossbar, a latch opening (D) in said carrier, and a shiftable latch hook (442) carried by said lower crossbar operably connected to said pushbutton for releasable engagement in said latch opening.

\* \* \* \* \*